US008446855B2

(12) United States Patent
Igarashi et al.

(10) Patent No.: US 8,446,855 B2
(45) Date of Patent: May 21, 2013

(54) ACCESS POINT, WIRELESS COMMUNICATION STATION, WIRELESS COMMUNICATION SYSTEM AND WIRELESS COMMUNICATION METHOD

(75) Inventors: Kei Igarashi, Yokohama (JP); Akira Yamada, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 936 days.

(21) Appl. No.: 12/549,662

(22) Filed: Aug. 28, 2009

(65) Prior Publication Data

US 2010/0054214 A1    Mar. 4, 2010

(30) Foreign Application Priority Data

Sep. 2, 2008  (JP) ................................. 2008-224984

(51) Int. Cl.
*H04B 7/216* (2006.01)

(52) U.S. Cl.
USPC ........................................................ 370/320

(58) Field of Classification Search
USPC ................. 370/319, 316, 315, 310, 320, 329, 370/328, 342
See application file for complete search history.

(56) References Cited

U.S. PATENT DOCUMENTS

| | | | |
|---|---|---|---|
| 6,628,613 B1 * | 9/2003 | Joung et al. | 370/230 |
| 7,251,235 B2 * | 7/2007 | Wentink | 370/338 |
| 8,107,968 B2 * | 1/2012 | Kasslin et al. | 455/451 |
| 8,233,462 B2 * | 7/2012 | Walton et al. | 370/338 |
| 2005/0135318 A1 * | 6/2005 | Walton et al. | 370/338 |
| 2007/0287456 A1 * | 12/2007 | Shimizu | 455/435.1 |
| 2008/0095091 A1 * | 4/2008 | Surineni et al. | 370/311 |
| 2008/0123577 A1 | 5/2008 | Jaakkola et al. | |

FOREIGN PATENT DOCUMENTS

| | | |
|---|---|---|
| CN | 1934881 A | 3/2007 |
| JP | 2003-198564 | 7/2003 |
| JP | 2004-336401 | 11/2004 |
| JP | 2007-295098 | 11/2007 |
| JP | 2008-22581 | 1/2008 |
| WO | WO 2005/094103 A1 | 10/2005 |

OTHER PUBLICATIONS

Office Action issued Oct. 19, 2011, in Chinese Patent Application No. 200910171568.9 with English translation.

(Continued)

*Primary Examiner* — Fan Ng
(74) *Attorney, Agent, or Firm* — Oblon, Spivak, McClelland, Maier & Neustadt, L.L.P.

(57) ABSTRACT

An access point for establishing wireless connection with one or more wireless communication stations which can perform intermittent reception operation, based on a packet transmission system which allocates wireless bands by CSMA/CA, has: unit for describing, in a same packet or in respective packets, buffering information on a downlink packet addressed to a subordinate wireless communication station currently in an intermittent reception state, and transmission prohibition period information indicating a period where transmission from the subordinate wireless communication station is prohibited; unit for transmitting the instruction described packet, in which the description has been made, to the subordinate wireless communication station; unit for making a state of the access point transit to a Doze state immediately after the instruction described packet is transmitted, or when a predetermined number of downlink packets are transmitted; and unit for making a state of the access point transit to an Awake state when the transmission prohibition period elapses from the time of transmission of the packet in which the prohibition period information is described.

12 Claims, 10 Drawing Sheets

OTHER PUBLICATIONS

Chinese Office Action issued Apr. 26, 2012, in Patent Application No. 200910171568.9 (with English-language translation).

"Wireless Lan Medium Access Control (MAC) and Physical Layer (PHY) specifications", ANSI/IEEE Std 802.11, Aug. 20, 1999, 528 pages.

Extended European Search Report issued Jul. 20, 2011, in Patent Application No. 09169204.6.

Japanese Office Action issued Apr. 24, 2012, in Patent Application No. 2008-224984 (with English-language translation).

* cited by examiner

ACCESS POINT, WIRELESS COMMUNICATION STATION, WIRELESS COMMUNICATION SYSTEM AND WIRELESS COMMUNICATION METHOD

BACKGROUND OF THE INVENTION

1. Field of the Invention

The present relates to an access point, wireless communication station, wireless communication system, and wireless communication method for performing wireless communication based on a packet transmission system which allocates wireless bands by CSMA/CA (Carrier Sense Multiple Access with Collision Avoidance).

2. Related Background Art

Recently wireless LAN interfaces are installed in various devices. In particular, the popularization of the IEEE 802.11 standard for personal computers, home electronic products and mobile terminals is remarkable. When a mobile terminal is used as a wireless communication station based on the IEEE 802.11 standard, the critical technology deals with power saving. Document "ANSI/IEEE std 802.11, Wireless LAN medium access control (MAC) and physical layer (PHY) specifications, 1999" describes the technology to implement power saving in wireless communication stations, using the following method.

In the case of the wireless LAN communication specified in IEEE 802.11, based on the cycle of common notification information (hereafter called "beacon"), an access point transmits beacons to wireless communication stations. A beacon includes a bit map called "TIM" (Traffic Indication Map), which indicates the presence of data stored for each wireless communication station which is currently operating in power saving mode. According to the Listen Interval (parameter to specify the cycle of receiving beacons), the wireless communication station, which is operating in power saving mode, regularly transits from the reception stopping state (hereafter "Doze state") to the reception standby state (hereafter "Awake state"), so as to receive beacons. The wireless communication station judges the presence of data addressed to this wireless communication station in the access point, by analyzing the TIM information element (bit map) of the received beacon. If data addressed to this wireless communication station is stored, this wireless communication station transmits a control frame called "PS-Poll" (Power Save-Poll), so that data is transferred from the access point to this wireless communication station, and the Awake state is maintained until the last frame is received. If the data addressed to this wireless communication station is not stored, on the other hand, this wireless communication station transits to the Doze state. In other words, the wireless communication station in power saving mode repeats transitions between the Awake state and the Doze state at a predetermined cycle.

In the above mentioned prior art, the power saving effect can be expected for the wireless communication station because of the intermittent reception, but the access point must maintain the Awake state at all times. There is no problem if the access point is in a state of constantly receiving a power supply, but if a mobile wireless communication device (that is, a wireless communication device which is not always in a state of constantly receiving a power supply) plays a role of an access point, power consumption of the access point becomes critical in the case of the above mentioned prior art.

SUMMARY OF THE INVENTION

With the foregoing in view, it is an object of the present invention to implement intermittent reception in the access point, so that the power saving effect is implemented in the access point.

To achieve the above object, an access point according to the present invention is an access point for establishing wireless connection with one or more wireless communication stations which can perform an intermittent reception operation, based on a packet transmission system which allocates wireless bands by CSMA/CA, including: an instruction description unit for describing, in a same packet or in respective packets, buffering information on a downlink packet addressed to a subordinate wireless communication station currently in an intermittent reception state, and transmission prohibition period information indicating a period where transmission from the subordinate wireless communication station is prohibited; a transmission unit for transmitting the instruction described packet in which description has been made by the instruction description unit, to the subordinate wireless communication station; a Doze state transition unit for making a state of the access point transit to a Doze state, immediately after the instruction described packet is transmitted by the transmission unit or when a predetermined number of downlink packets are transmitted; and an Awake state transition unit for making a state of the access point transit to an Awake state when the transmission prohibition period elapses from the time of transmission of the packet in which the transmission prohibition period information is described.

According to this configuration, the access point can control the transmission timing of the uplink packet from a subordinate wireless communication station, and intermittent reception in the access point can be implemented, and the power saving effect can be expected.

It is preferable that the access point further includes a transmission prohibition period calculation unit for calculating the transmission prohibition period. And it is preferable that the transmission unit includes: a transmission timing setting unit for setting a transmission timing of the instruction described packet; and a packet transmission unit for transmitting the instruction described packet at a transmission timing which is set by the transmission timing setting unit.

In the access point, it is preferable that the instruction description unit describes, in a same beacon, both the buffering information and the transmission prohibition period information. According to this configuration, the transmission prohibition period information, along with the buffering information, can be described in the same beacon, and a packet need not be transmitted only for notifying the transmission prohibition period information, therefore radio utilization efficiency can be improved.

In the access point, the instruction description unit describes, in the beacon, the transmission prohibition period information and buffering information to notify that a unicast packet is not buffered but a broadcast packet is buffered regardless of the actual buffering state of the downlink packets, the transmission unit transmits the beacon to the subordinate wireless communication stations, then transmits one or more unicast packets actually buffered, and then transmits a broadcast packet to notify that subsequent packets are not buffered, to the subordinate wireless communication stations, and the Doze state transition unit transits a state of the access point to a Doze state after the broadcast packet is transmitted. According to this configuration, even if the wireless communication station during intermittent communication, which exists under the access point, does not transmit the downlink packet transfer request packet (PS-Poll), the access point can transmit the downlink packet, so the radio utilization efficiency can be improved.

In the access point, the instruction description unit generates: a transmission prohibition instruction beacon, in which the transmission prohibition period information and buffering information to notify that neither a unicast packet nor broadcast packet is buffered regardless of the actual buffering state of the downlink packets are described; and a normal beacon in which actual buffering information of the downlink packet is described, the transmission unit transmits the transmission prohibition instruction beacon or the normal beacon to the subordinate wireless communication stations at a predetermined beacon transmission time, and the Doze state transition unit transits a state of the access point to a Doze state after the transmission prohibition instruction beacon is transmitted. According to this configuration, the access point can transits to the Doze state immediately after the transmission prohibition instruction beacon is transmitted, and a subordinate wireless communication station can transmit to the Doze state immediately when it is judged that a downlink packet to this station does not exist, so the power saving effect can be expected in both the access point and the subordinate wireless communication station.

In the access point, it is preferable that the instruction description unit describes the buffering information in a beacon, and describes the transmission prohibition period information in a packet which is different from the beacon. According to this configuration, the packet in which the transmission prohibition period information is described and the beacon in which the buffering information is described are implemented as separate packets, and the duration field of the beacon can be implemented as a conventional description, therefore the mounting load on the beacon can be decreased. Also the transmission prohibition period information can be notified without depending on the beacon, so flexibility of the packet transmission procedure can be improved.

In the access point, it is preferable that the instruction description unit describes, in the beacon, buffer information to notify that a broadcast packet is buffered regardless of the actual buffering state of the downlink packets, and describes the transmission prohibition period information in a broadcast packet which is different from the beacon, the transmission unit transmits the beacon in which the buffering information is described, then transmits the broadcast packet, or transmits the broadcast packet only after transmitting a predetermined number of unicast packets which are actually buffered, the Doze state transition unit transits the state of the access point to the Doze state after transmitting the broadcast packet, and a transmission standby time of the broadcast packet after the transmission of the beacon is set to a value smaller than a transmission standby time of an uplink packet which is transmitted by the subordinate wireless communication station. According to this configuration, the access point can transmit a broadcast packet to notify the transmission prohibition period information and make this access point transit to the Doze state after the beacon is sent, without a transmission interrupt by an uplink packet from a subordinate wireless communication station, therefore notification of the transmission prohibition period information and transition of the access point to the Doze state can be executed efficiently.

In the access point, it is preferable that the instruction description unit describes, in the beacon, buffering information to notify that no packet is buffered, regardless of the actual buffering state of the downlink packet, and describes the transmission prohibition period information in a broadcast packet which is different from the beacon, the transmission unit transmits the broadcast packet, in which the transmission prohibition period information is described, at a predetermined beacon transmission time or immediately before the beacon transmission time, and then transmits the beacon in which the buffering information is described, and the Doze state transition unit transits the state of the access point to the Doze state after the beacon is transmitted. According to this configuration, the broadcast packet in which the transmission prohibition period information is described is transmitted before the transmission of the beacon in which the buffering information to notify that no packet is buffered, so the access point does not receive an uplink packet from a subordinate wireless communication station after transmission of the beacon. Therefore the access point can transit to the Doze state immediately after transmission of the beacon.

In the access point, it is preferable that when a packet which is being buffered exists, the instruction description unit describes, in the beacon, buffering information to notify that a broadcast packet is buffered, and describes the transmission prohibition period information in a broadcast packet for transmission prohibition instruction which is different from the beacon, the transmission unit transmits the broadcast packet for transmission prohibition instruction at a predetermined beacon transmission time or immediately before the beacon transmission time, transmits the beacon in which the buffering information is described, then transmits one or more packets actually buffered, and then transmits a broadcast packet for end notification to notify that subsequent packets are not buffered, to the subordinate wireless communication stations, and the Doze state transition unit transits the state of the access point to the Doze state after the broadcast packet for end notification is transmitted. According to this configuration, after transmitting the broadcast packet for the transmission prohibition instruction, the access point sequentially transmits a beacon in which buffering information to notify that a broadcast packet is buffered is described and one or more packets which are actually buffered, so that a packet transmission delay can be suppressed. By transmitting the broadcast packet for end notification thereafter, the access point can immediately transit to the Doze state.

It is preferable that the access point further includes a judgment unit for judging whether all of the subordinate wireless communication stations are constantly operating in Awake mode or a subordinate wireless communication station operating in an intermittent reception mode exists, wherein when the judgment unit judges that a subordinate wireless communication station operating in the intermittent reception mode exists, the instruction description unit describes the transmission prohibition period information in a DTIM beacon or a packet which is transmitted immediately before or immediately after the DTIM beacon transmission time. According to this configuration, the access point transmits the transmission prohibition period information by describing it in the DTIM beacon, or in a packet which is transmitted immediately before or immediately after the DTIM beacon transmission time, whereby the certainty of notifying the transmission prohibition period information can be improved.

In the access point, it is preferable that when the judgment unit judges that all the wireless communication stations are constantly operating in Awake mode, the transmission unit transmits the packet in which the transmission prohibition period information is described at a time which does not depend on the transmission timing of beacons. According to this configuration, the transmission prohibition period information can be flexibly notified without depending on the beacon cycle, so the power saving effect of the access point can be improved.

The present invention can also be regarded as an invention related to a wireless communication system and an invention related to a wireless communication method, which can be described as follows.

A wireless communication system according to the present invention is a wireless communication system having an access point and one or more wireless communication stations that can perform intermittent reception operation, between which wireless connection is established based on a packet transmission system which allocates wireless bands by CSMA/CA, the access point including: an instruction description unit for describing, in a same packet or in respective packets, buffering information on a downlink packet addressed to a subordinate wireless communication station currently in an intermittent reception state, and transmission prohibition period information indicating a period where transmission from the subordinate wireless communication station is prohibited; a transmission unit for transmitting the instruction described packet, in which description has been made by the instruction description unit, to the subordinate wireless communication station; a Doze state transition unit for making a state of the access point transit to a Doze state immediately after the instruction described packet is transmitted by the transmission unit, or when a predetermined number of downlink packets are transmitted; and an Awake state transition unit for making a state of the access point transit to an Awake state when the transmission prohibition period elapses from the time of transmission of the packet in which the transmission prohibition period information is described.

A wireless communication method according to the present invention can be described as follows. A plurality of processing steps constituting the wireless communication method can be depicted as FIG. 10. In other words, the wireless communication method according to the present invention is a wireless communication method that is executed by an access point which establishes wireless connection with one or more wireless communication stations which can perform intermittent reception operation, based on a packet transmission system which allocates wireless bands by CSMA/CA, the method including: an instruction description step of describing, in a same packet or in respective packets, buffering information of a downlink packet addressed to a subordinate wireless communication station currently in an intermittent reception state, and transmission prohibition period information indicating a period where transmission from the subordinate wireless communication station is prohibited (step S1 in FIG. 10); a transmission step of transmitting the instruction described packet, in which description has been made in the instruction description step, to the subordinate wireless communication station (step S2 in FIG. 10); a Doze state transition step of making a state of the access point transit to a Doze state immediately after the instruction described packet is transmitted in the transmission step, or when a predetermined number of the downlink packets are transmitted (step S3 in FIG. 10); and an Awake state transition step of making a state of the access point transit to an Awake state when the transmission prohibition period elapses from the time of transmission of the packet in which the transmission prohibition period information is described (step S4 in FIG. 10).

According to the present invention, the access point performs intermittent reception without increasing the packet transmission delay while maintaining the power saving effect due to the intermittent reception of the wireless communication stations under this access point, therefore the power saving effect on the access point can be expected, and continuous communication time can be improved.

DESCRIPTION OF THE PREFERRED EMBODIMENTS

Now embodiments applying a method according to the present invention will be described. In the scenario of the present embodiment to be described, one wireless communication device with an installed wireless LAN interface plays a role of an access point (hereinafter called "AP"), and the other one or more wireless communication device(s) with an installed wireless LAN interface, as a wireless communication station (hereinafter called "STA"), perform(s) wireless LAN communication with the AP.

Figure 1:
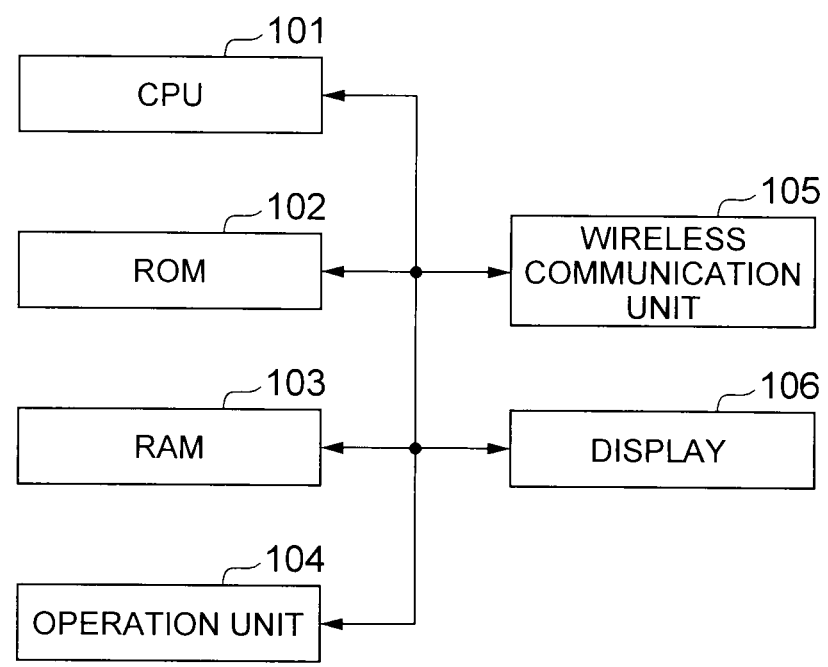
FIG. 1 is a hardware block diagram of AP (access point).
Figure 2:
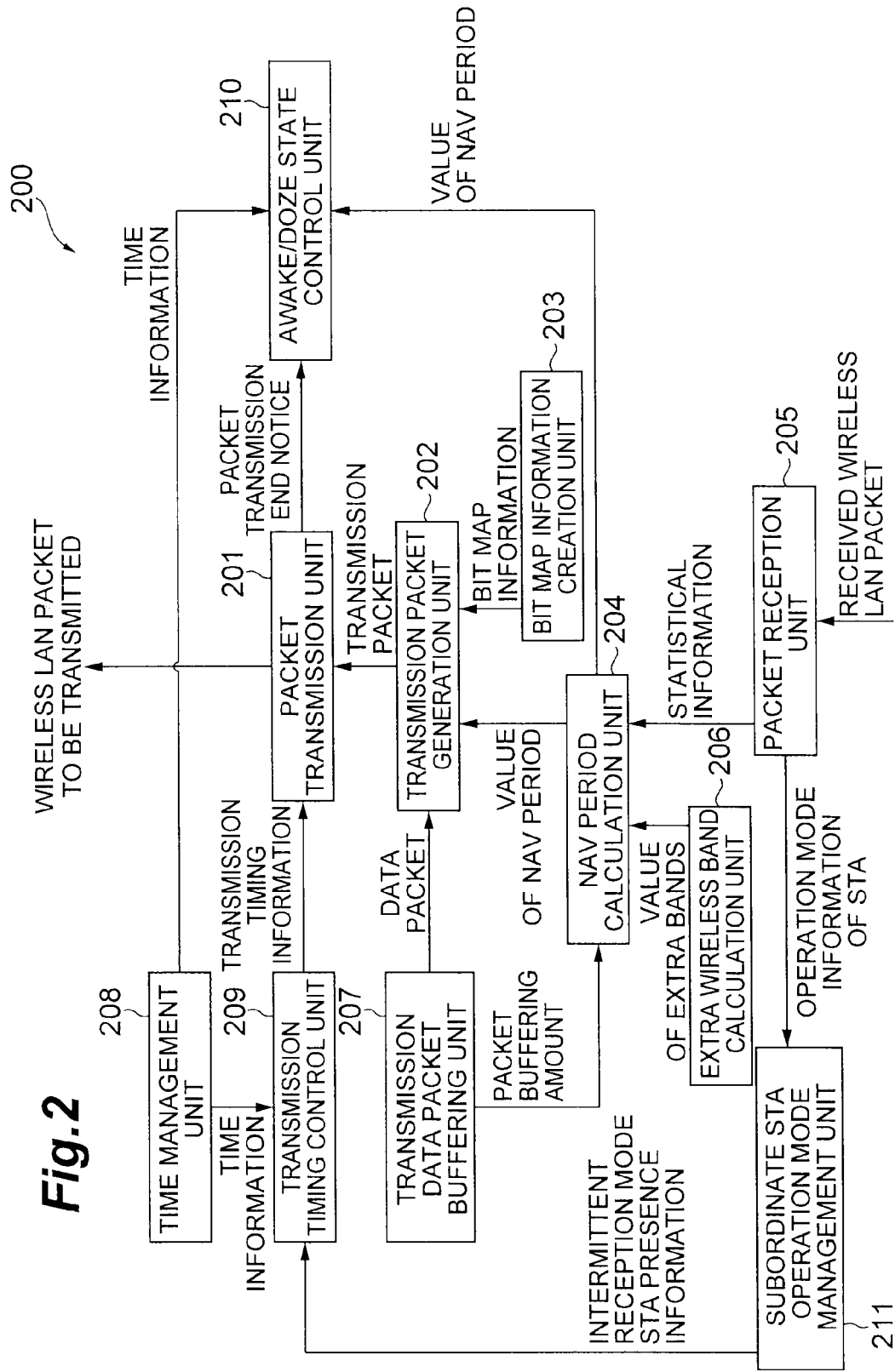
FIG. 2 is a functional block diagram of AP.

The AP has a hardware configuration shown in FIG. 1, and a functional block configuration shown in FIG. 2. As FIG. 1 shows, the AP has a CPU 101 which is an information processing device, memories such as ROM 102 and RAM 103, an operation unit 104 such as a keyboard and operation buttons, a wireless communication unit 105 which can perform wireless LAN communication, and a display 106.

Now the functional blocks of the AP 200 shown in FIG. 2 will be described. AP 200 has a packet transmission unit 201 which transmits a packet, a transmission packet generation unit 202 which generates a packet to be transmitted, a bit map information creation unit 203 which creates bit map information, an NAV period calculation unit 204 which calculates NAV periods, a packet reception unit 205 which receives a packet, an extra wireless band calculation unit 206 which calculates extra wireless bands, a transmission data packet buffering unit 207 which buffers a data packet to be transmitted, a time management unit 208 which manages current time, a transmission timing control unit 209 which controls a transmission timing, an Awake/Doze state control unit 210 which controls the state transition between the Awake state and Doze state in AP 200, and a subordinate STA operation mode management unit 211 which manages an operation mode of a subordinate STA.

The packet transmission unit 201 is configured by the wireless communication unit 105, receives a transmission packet from the transmission packet generation unit 202, receives transmission timing information from the transmission timing control unit 209, transmits a transmission wireless LAN packet to the outside, and sends a packet transmission end notice to the Awake/Doze state control unit 210.

The transmission packet generation unit 202 is configured by the CPU 101 and wireless communication unit 105, receives bit map information from the bit map information creation unit 203, receives a value of an NAV period from the NAV period calculation unit 204, receives a data packet from the transmission data packet buffering unit 207, and sends the transmission packet to the packet transmission unit 201.

The bit map information creation unit 203 is configured by the CPU 101 and wireless communication unit 105, and sends the bit map information to the transmission packet generation unit 202.

The NAV period calculation unit 204 is configured by the CPU 101, ROM 102 and RAM 103, receives statistical information from the packet reception unit 205, receives a value of extra wireless bands from the extra wireless band calculation unit 206, receives a packet buffering amount from the transmission data packet buffering unit 207, and sends the value of the NAV period to the transmission packet generation unit 202 and Awake/Doze state control unit 210.

The packet reception unit 205 is configured by the wireless communication unit 105, receives a wireless LAN packet from the outside, and sends operation mode information on STA to the subordinate STA operation mode management unit 211.

The extra wireless band calculation unit 206 is configured by the CPU 105, ROM 102 and RAM 103, and sends a value of extra wireless bands to the NAV period calculation unit 204.

The transmission data packet buffering unit 207 is configured by the ROM 102, RAM 103 and wireless communication unit 105, sends the data packet to the transmission packet generation unit 202, and sends the packet buffering amount to the NAV period calculation unit 204.

The time management unit 208 is configured by the wireless communication unit 105, and sends the time information to the transmission timing control unit 209 and the Awake/Doze state control unit 210.

The transmission timing control unit 209 receives the time information from the time management unit 208, receives intermittent mode STA existence information from the subordinate STA operation mode management unit 211, and sends the transmission timing information to the packet transmission unit 201.

The Awake/Doze state control unit 210 is configured by the wireless communication unit 105, receives a packet transmission end notice from the packet transmission unit 201, receives a value of an NAV period from the NAV period calculation unit 204, and receives time information from the time management unit 208.

The subordinate STA operation mode management unit 211 is configured by the ROM 102 and RAM 103, receives STA operation mode information from the packet reception unit 205, and sends intermittent reception mode STA existence information to the transmission timing control unit 209.

The "instruction description unit" described in Claims is implemented by the packet transmission unit 201, transmission packet generation unit 202, bit map information creation unit 203, and NAV period calculation unit 204; and "transmission unit" is implemented by the packet transmission unit 201, transmission packet generation unit 202, transmission data packet buffering unit 207, time management unit 208, and transmission timing control unit 209.

The "Doze state transition unit" is implemented by the packet transmission unit 201 and the Awake/Doze state control unit 210, and the "Awake state transition unit" is implemented by the NAV period calculation unit 204, time management unit 208, and Awake/Doze state control unit 210.

The "transmission prohibition period calculation unit" is implemented by the NAV period calculation unit 204, extra wireless band calculation unit 206, and transmission data packet buffering unit 207, and the "judgment unit" is implemented by the packet reception unit 205 and subordinate STA operation mode management unit 211.

The "transmission timing setting unit" included in the transmission unit is implemented by the time management unit 208 and transmission timing control unit 209; and the "packet transmission unit" is implemented by the packet transmission unit 201 and transmission packet generation unit 202.

Figure 3:
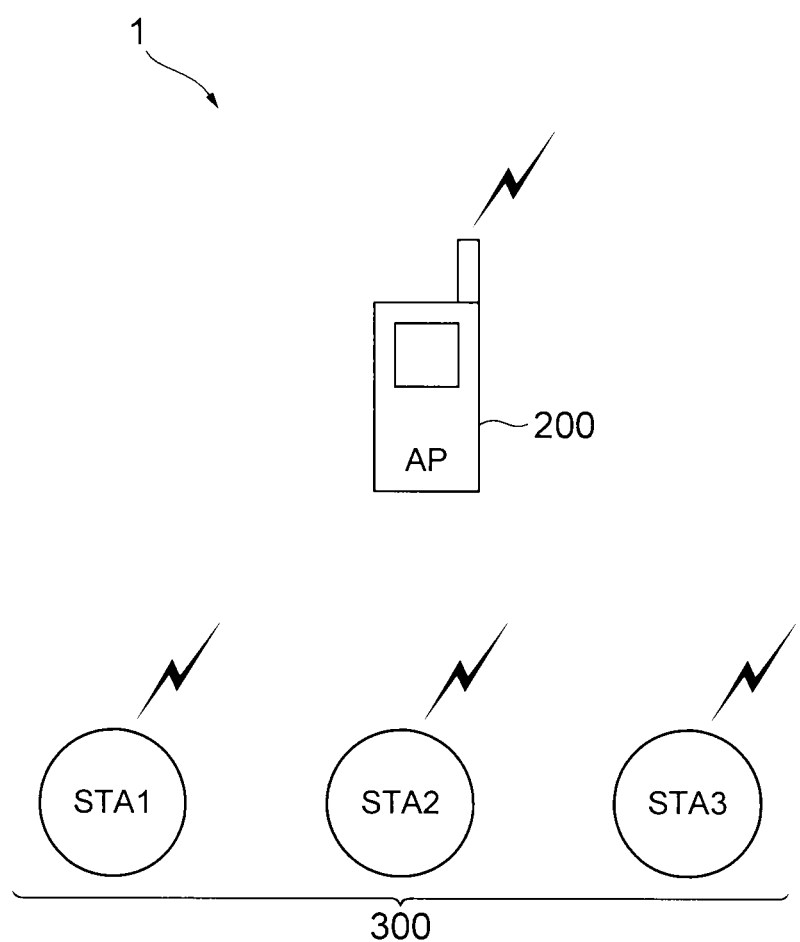
FIG. 3 is a diagram depicting a configuration of a wireless communication system.

FIG. 3 shows a configuration of a wireless communication system according to the present embodiment. As FIG. 3 shows, the wireless communication system 1 is comprised of an AP 200 and a plurality of STAs 300. In this example, it is assumed that STA1, STA2 and STA3, as the plurality of STAs 300, are disposed under the AP 200, so as to perform wireless LAN communication with the AP 200. The number of STAs is not limited to three, but may be any number. It is assumed that each STA (each of the three STAs, that is, STA1, STA2 and STA3) perform wireless LAN communication in power saving mode, based on intermittent reception operation.

Figure 4:
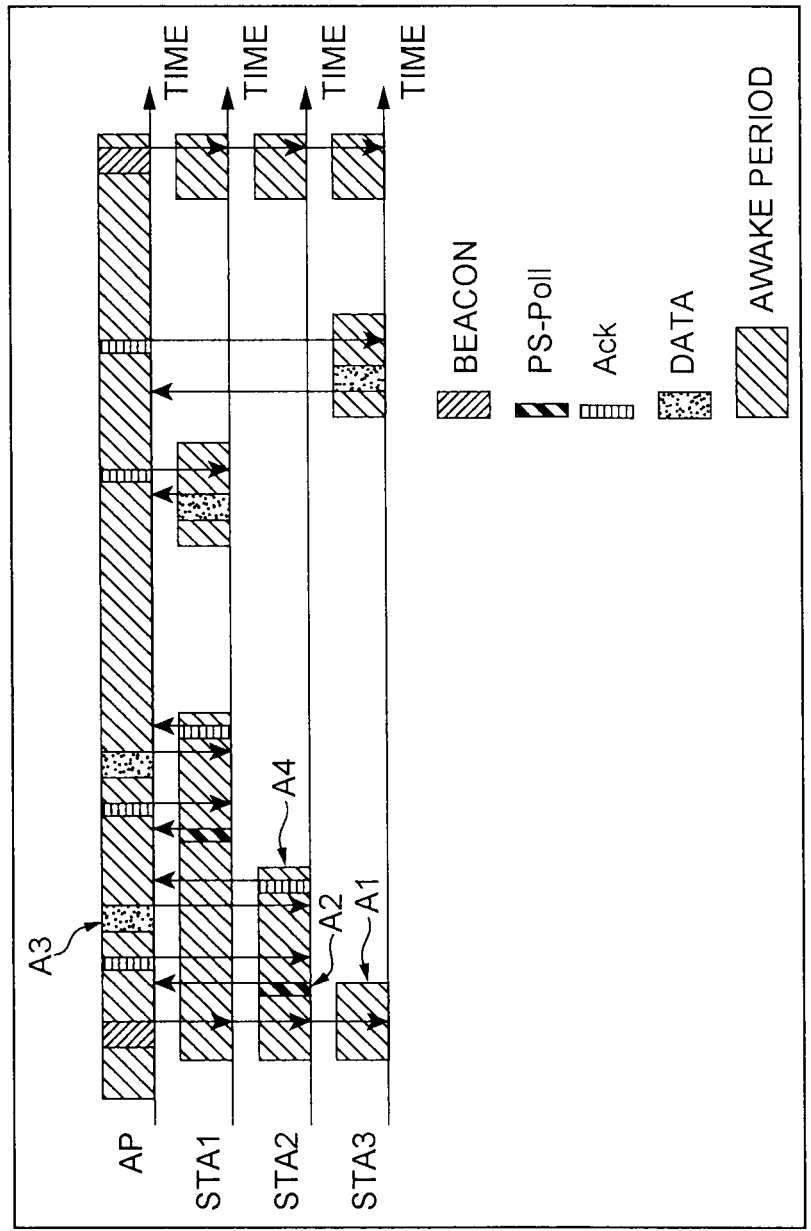
FIG. 4 is a sequence diagram when the present invention is not applied.

For comparison, a case of not applying the present invention will now be described. In the case of not applying the present invention, a sequence shown in FIG. 4 is generated according to the IEEE 802.11 standard. Each STA receives a beacon from the AP, and judges whether or not unicast data addressed to this STA is buffered in the AP, based on a bit map described in the received beacon. If unicast data addressed to this STA is buffered in the AP, this STA transmits a frame called "PS-Poll" to the AP, so as to prompt the AP to transmit a downlink packet. This bit map is regarded as a table equivalent to a table for notifying whether or not broadcast/multicast data is buffered, and whether or not unicast data addressed to each STA is buffered.

In the case of the above mentioned technology, each STA transits to the Awake state at the beacon transmission timing in order to receive a beacon, and STA3, for example, judges that a downlink packet addressed to STA3 is not buffered with reference to the bit map, and immediately transits to the Doze state (A1 in FIG. 4). On the other hand, STA1 judges that the downlink packet addressed to the STA1 is buffered with reference to the bit map, and transmits PS-Poll so as to transmit the downlink packet from the AP. STA2 also judges that the downlink packet addressed to the STA2 is buffered with reference to the bit map, and transmits PS-Poll so as to transmit the downlink packet from the AP. For example, STA2 transmits PS-Poll to the AP (A2 in FIG. 4), and the AP which received PS-Poll transmits a downlink data packet to the transmission source STA2 (A3 in FIG. 4). Here STA2 refers to the more data bit (bit to notify whether or not subsequent downlink packets are buffered) which is set in the received downlink data packet, and judges whether or not the subsequent downlink packets are buffered. If the subsequent downlink packets are not buffered, STA2 transmits to the Doze state (A4 in FIG. 4). Thereafter STA1 also operates in the same way as STA2. In the case of prior art, in which the uplink data packet can be transmitted at any time, STA can transit to the Awake state anytime, and transmit the packet to the AP if the uplink packet is to be transmitted. In this method, however, the AP must operate constantly in the Awake state, which results in power consumption becoming a serious problem.

Now the case of applying the present invention to AP will be described. According to the present invention, AP describes a value equivalent to the transmission prohibition period in a duration field of a packet. The duration field is normally for describing information on time required for the transmission/reception procedure of a packet, and is used for setting to prohibit transmission for the time described in the duration field (setting NAV (Network Allocation Vector), that is, transmission prohibition time of the packet in CSMA/CA). The STA which received information on NAV stops the transmission procedure during this NAV period, regardless of whether or not this STA is set in the destination field of this packet.

In the case of the present invention, a beacon is used for the above mentioned packet, and the NAV period is intentionally set to a value greater than time required for the transmission/reception procedure of this beacon. Because of this, the STA which received this beacon is prohibited from transmitting until this NAV period elapses, so the AP need not be in a state of receiving uplink packets from the STA. This beacon, in which the NAV period is set, is called a "transmission prohibition instruction beacon". After sending the transmission prohibition instruction, AP transits to the Doze state until this NAV period elapses, whereby power consumption in the AP can be decreased.

However, as already mentioned, if the STA which received the bit map information in the beacon confirms that the downlink packet address to this STA is buffered in the AP, the STA may wait for the transmission timing to send PS-Poll to AP, maintaining the Awake state until the NAV period elapses. This may unnecessarily consume power of the STA during the NAV period. Therefore in the present invention, further improvement is made using one of the following two methods, so that power consumption in both the STA and AP can be minimized.

The first method will be described with reference to FIG. 5. According to the first method, regardless of whether or not a downlink packet for unicast addressed to any STA is buffered, the AP describes that "only BC/MC (Broadcast/Multicast) packets are buffered, and the downlink packets for unicast addressed to any STA are not buffered" in the bit map in the transmission prohibition instruction beacon, and transmits this transmission prohibition instruction beacon to the subordinate STAs (B1 in FIG. 5). Here this beacon is a transmission prohibition instruction beacon, so a value greater than the time required for the transmission/reception procedure of this beacon is intentionally set for the NAV period. All the STAs which received this beacon maintain the Awake state in order to receive a BC/MC packet.

Figure 5:
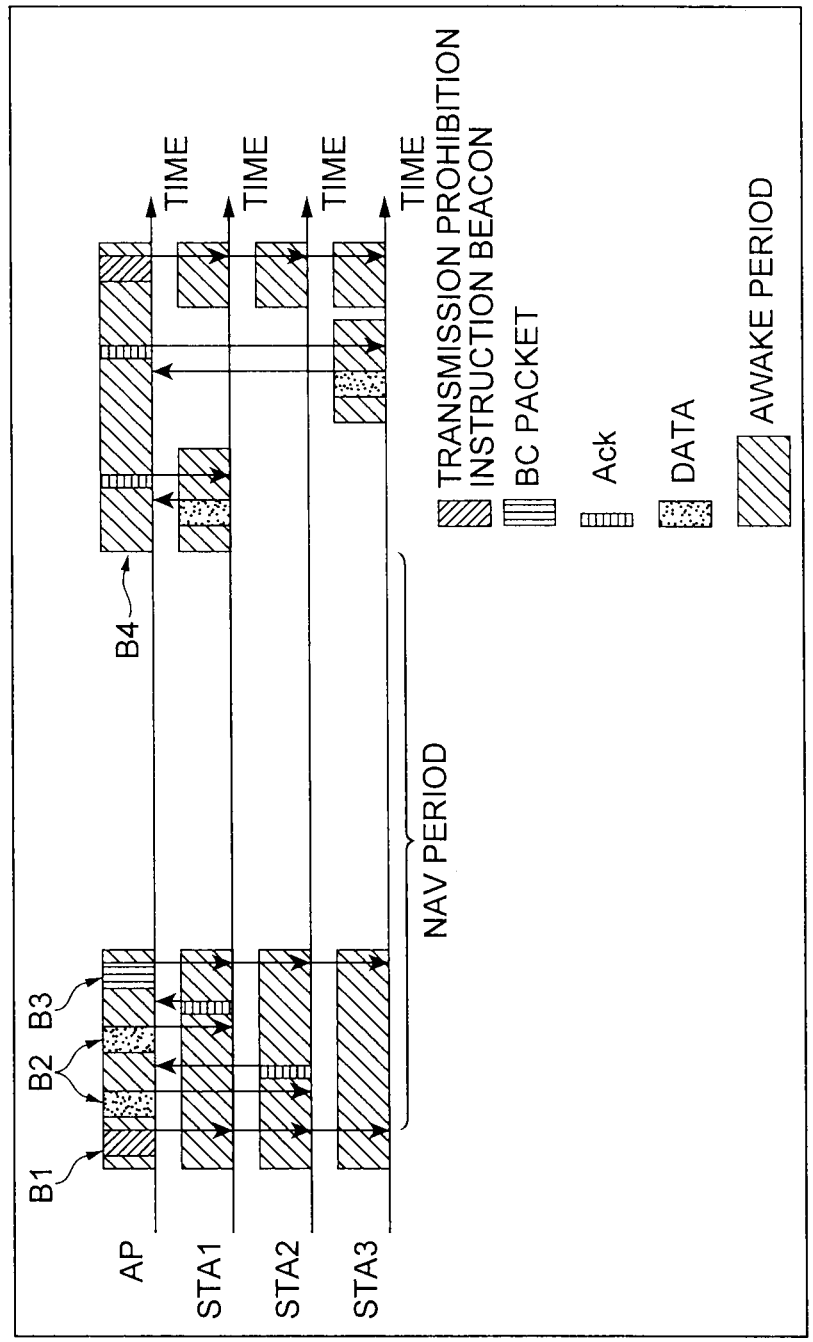
FIG. 5 is a sequence diagram when a first method according to the present invention is applied.

Then AP transmits the actually buffered downlink packets to the subordinate STAs (B2 in FIG. 5). After completing transmission of all the downlink packets that are being buffered, or after completing transmission of a predetermined number of downlink packets, the AP broadcasts the BC packets (B3 in FIG. 5). A BC packet may include some data, or may include only dummy data. The "more data bit" in the BC packet, however, is set to "0", so that all the STAs which received this BC packet transit to the Doze state. After this BC packet is transmitted, the AP also transits to the Doze state. Then when the NAV period elapses from the transmission of the transmission prohibition instruction beacon, the AP transits again to the Awake state (B4 in FIG. 5). And the communication of uplink packets are executed after the NAV period elapses.

Figure 6:
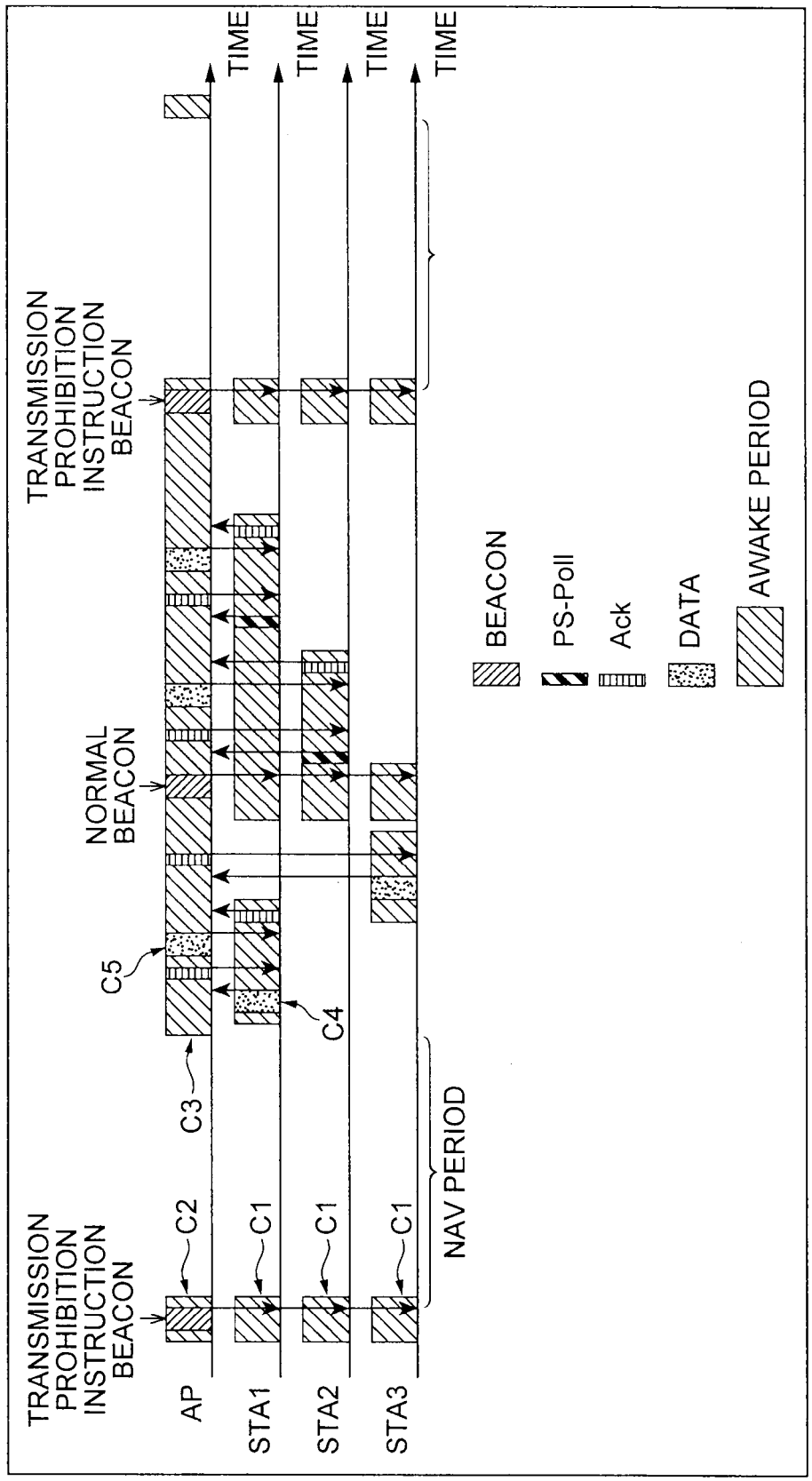
FIG. 6 is a sequence diagram when a second method according to the present invention is applied.

The second method will now be described with reference to FIG. 6. According to the second method, regardless of whether or not a downlink packet for unicast addressed to any STA is buffered, the AP describes "no downlink packets, for neither BC/MC or unicast, are buffered" in the bit map for one beacon (transmission prohibition instruction beacon), and transmits this beacon to the subordinate STAs, with setting the NAV period to a value greater than the time required for the transmission/reception procedure of this beacon, and for another beacon (normal beacon), the AP describes actual buffering information on the downlink packets in the bit map, and transmits this beacon to the subordinate STAs. FIG. 6 shows an example of alternately transmitting the transmission prohibition instruction beacon and the normal beacon (that is, an example of transmitting these beacons at the same frequency), but only if appropriate communication is ensured, the transmission prohibition instruction beacons may be transmitted at any frequency, or the transmission frequency of the transmission prohibition instruction beacons may be non-periodic.

As FIG. 6 shows, all the STAs which received the transmission prohibition instruction beacon recognize that no downlink packets are buffered with reference to the bit map, and immediately transit to the Doze state (C1 in FIG. 6). In this case, AP also transits to the Doze state immediately after this transmission prohibition instruction beacon is transmitted (C2 in FIG. 6). Then when the NAV period elapses from the transmission of the transmission prohibition instruction beacon, AP transits to the Awake state (C3 in FIG. 6). If an uplink packet exists, on the other hand, STA may transit to the Awake state, so as to transmit this uplink packet to AP (C4 in FIG. 6). If an uplink packet is received from STA and a downlink packet buffered in this STA exists at this time, AP may transmit this downlink packet to this STA, since this STA is in the Awake state (C5 in FIG. 6).

If the above mentioned first method or second method is used, a power saving effect in AP can be expected, and power saving in an STA can also be efficiently implemented, since an STA need not wait for the NAV period to elapse for a PS-Poll transmission during the NAV period, and need not maintain the Awake state during the NAV period.

In the above embodiment, the transmission prohibition instruction is sent by a beacon, but a transmission prohibition instruction may be sent by a packet other than a beacon, with setting the transmission prohibition period of the STA (a value greater than the time required for transmission/reception of this packet) in the duration field of the packet, since the duration field in which the NAV period is described also exists in a normal packet. Such a packet is called a "transmission prohibition instruction packet". The transmission prohibition instruction packet may be transmitted as unicast, or may be transmitted as broadcast or multicast. To send the transmission prohibition instruction using a packet other than a beacon, the transmission timing of this packet is as follows.

If all subordinate STAs operate in active mode, that is, if they are constantly in the Awake state, the AP can transmit a transmission prohibition instruction packet at any time.

If an STA which operates in intermittent reception mode exists under the AP, then the transmission prohibition instruction pocket is transmitted immediately before or immediately after the beacon is transmitted. Now a procedure to transmit the transmission prohibition instruction packet immediately after the transmission of the beacon (FIG. 7) and a procedure to transmit the transmission prohibition instruction packet immediately before the transmission of the beacon (FIG. 8) are described in sequence.

Figure 7:
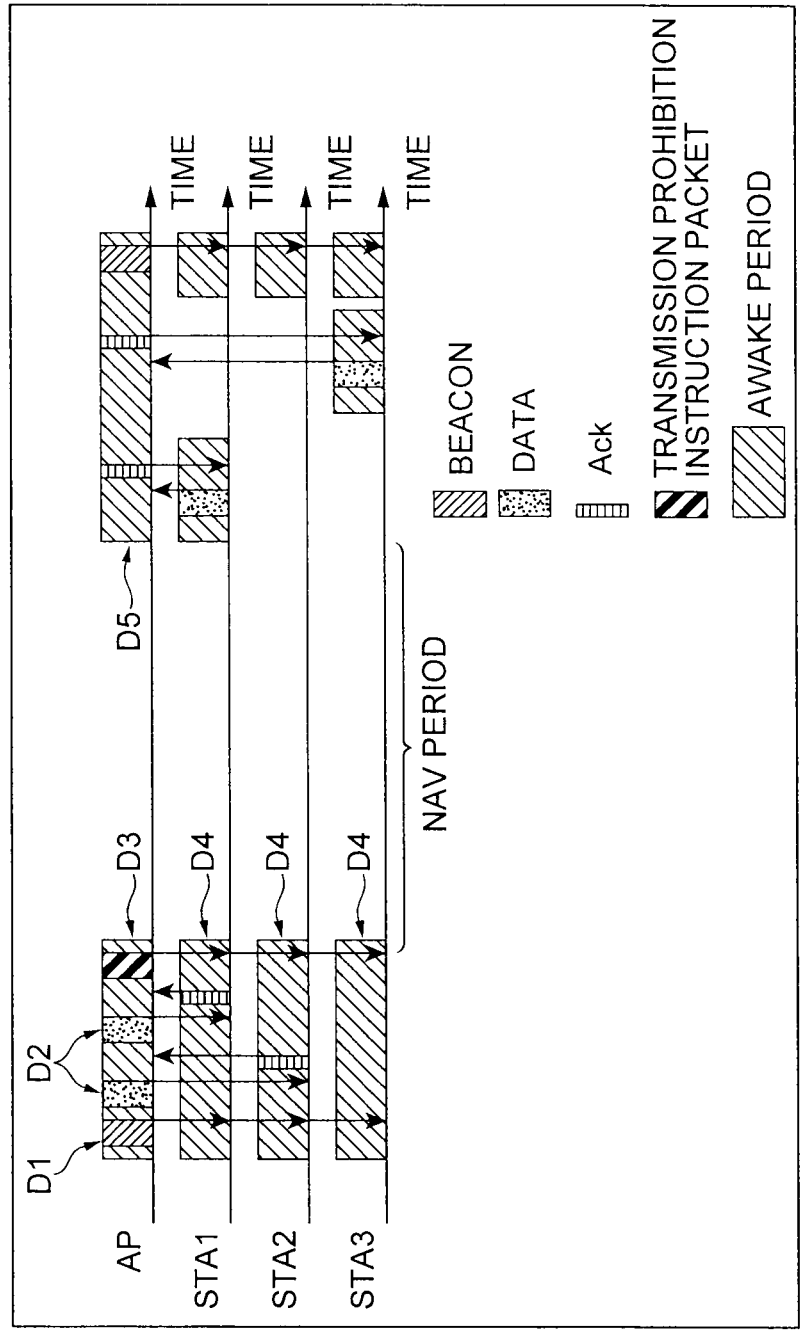
FIG. 7 is a sequence diagram when a transmission prohibition instruction packet is transmitted immediately after the transmission of a beacon in an environment where STA (wireless communication station) operating in intermittent reception mode exists.

When the transmission prohibition instruction packet is transmitted immediately after the transmission of the beacon, the procedure shown in FIG. 7 is executed. In this case, it is necessary to describe that "BC/MC packet is buffered" in the bit map of the beacon to be transmitted. This is because subordinate STAs may transit to the Doze state immediately after receiving this beacon, and reception of the transmission prohibition instruction packet to be transmitted after this beacon may fail. In the bit map of the beacon at this time, a notification that "no unicast packets are buffered" may be intentionally added to the above notification, or an actual buffering state in the AP may be described as is.

In the case of the former (the case of describing "no unicast packets are buffered"), the AP broadcasts the transmission prohibition instruction packet where the NAV period is set in the duration field immediately or after transmitting downlink unicast packets which are actually buffered, and transits to the Doze state. In this case, the more data bit field in the transmission prohibition instruction packet is set to "0". Thereby the STA which received the transmission prohibition instruction packet recognizes that no subsequent packets exist, and can transit to the Doze state, and power saving in the STA is improved. In the case of FIG. 7, for example, AP transmits a beacon, where the notifications that "BC/MC packet is buffered" and "no unicast packet is buffered" are described in the bit map, (D1 in FIG. 7). Then AP transmits the actually buffered downlink unicast packet (D2 in FIG. 7). And AP broadcasts the transmission prohibition instruction packet in which the more data field is set to "0", and transits to the Doze state (D3 in FIG. 7). On the other hand, STA, which received the transmission prohibition instruction packet as well, recognizes that no subsequent packets exist, and transits to the Doze state (D4 in FIG. 7) Then AP transits to the Awake state when the NAV period elapses from the transmission of the transmission prohibition instruction packet (D5 in FIG. 7).

In the case of the latter (the case of describing the actual buffering state in AP), on the other hand, PS-Poll may be transmitted from the STA which received the beacon to the AP, so AP sets a value smaller than the standby time for STA to transmit PS-Poll, as the standby time for broadcasting the transmission prohibition instruction packet immediately after the transmission of the beacon. Thereby, it can be minimized that transmission of the PS-Poll from STA to AP (i.e. interrupt of PS-Poll) occurs before broadcasting the transmission prohibition instruction packet by AP.

Figure 8:
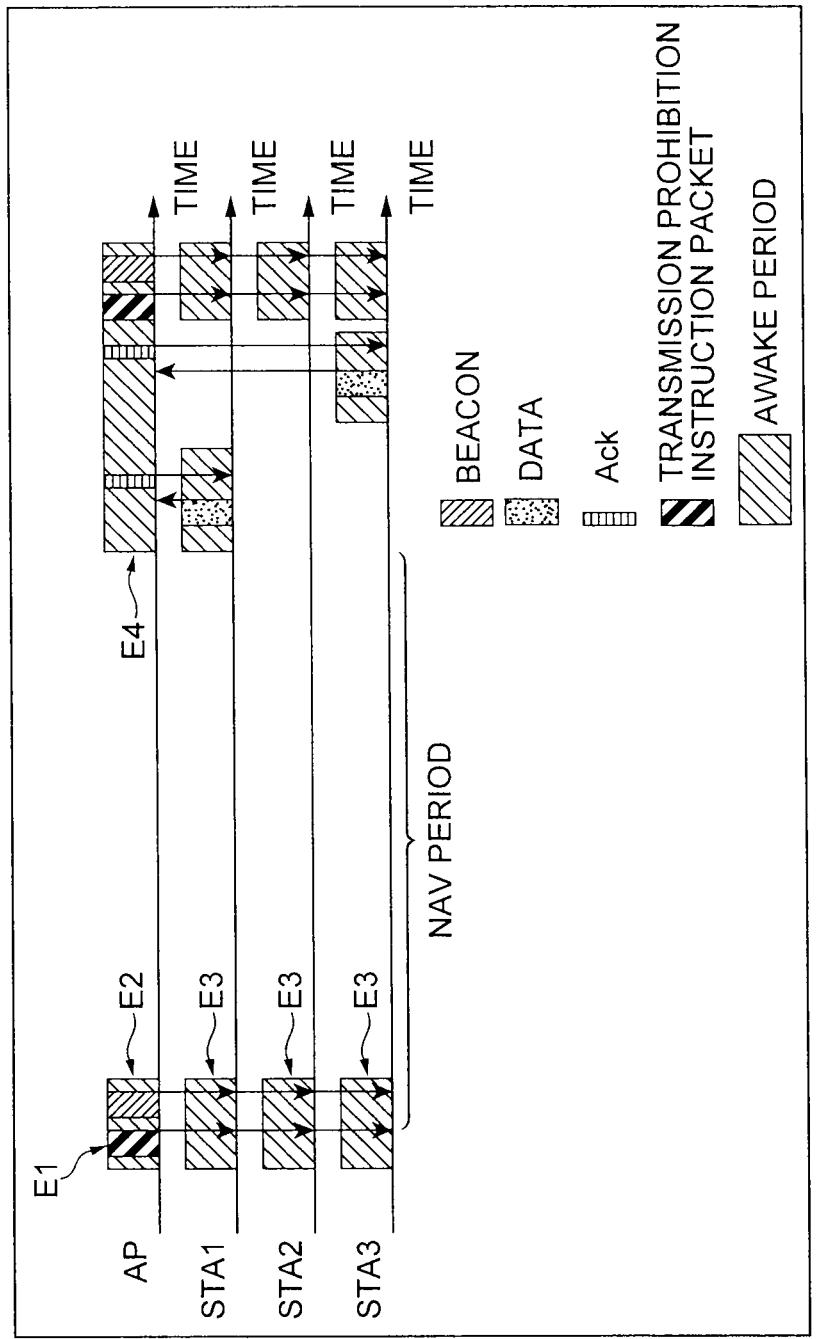
FIG. 8 is a sequence diagram when a transmission prohibition instruction packet is transmitted immediately before the transmission of a beacon in an environment where STA operating in intermittent reception mode exists.

When the transmission prohibition instruction packet is transmitted immediately before the transmission of the beacon, the procedure shown in FIG. 8 is executed. In this case, AP broadcasts the transmission prohibition instruction packet, in which the NAV period is set, at the time when the beacon transmission is scheduled. Thereby the subordinate STAs are prohibited transmission during the NAV period. Then AP transmits the beacon. At this time, in the bit map of the beacon, a notification that "only broadcast packets are buffered" may be described, or a notification that "no packets are buffered" may be described, regardless of the type and number of the packets actually buffered in the AP.

In the case of the former (the case of describing "only broadcast packets are buffered" in the bit map of the beacon), STAs which received the beacon continuously maintain the Awake state after receiving the beacon. Therefore AP can transmit downlink unicast packets, multicast packets and broadcast packets which are actually buffered, to STAs, and a packet transmission delay can be suppressed. After transmitting the buffered packets, AP transmits the broadcast packet in which "0" is set in the more data bit field, and transits to the Doze state. STAs which received this broadcast packet recognize that no subsequent packets exist, and also transit to the Doze state.

In the case of the latter (the case of describing "no packets are buffered" in the bit map of the beacon), on the other hand, STAs which received the beacon recognize that no packets are buffered, and immediately transit to the Doze state. For example, in the example in FIG. 8, the AP broadcasts the transmission prohibition instruction packet, in which the NAV period is set, at the time when beacon transmission is scheduled (E1 in FIG. 8). Thereby the subordinate STAs are prohibited transmission during the NAV period. Then the AP transmits the beacon in which "no packets are buffered" is described in the bit map, and transit to the Doze state (E2 in FIG. 8). STAs which received this beacon, on the other hand, also recognize that no packets are buffered, and immediately transit to the Doze state (E3 in FIG. 8). In this way, a power saving effect can be expected in both the AP and STAs. Then when the NAV period elapses from the transmission of the transmission prohibition instruction packet, the AP transits to the Awake state (E4 in FIG. 8).

In the cases of both sending the transmission prohibition instruction by a beacon and sending the transmission prohibition instruction by a packet other than a beacon, according to the method of the present invention, the following advantages can be expected by sending the transmission prohibition instruction using a special beacon called a "DTIM beacon", or by sending a packet immediately before or immediately after this beacon, if a subordinate STA operating in intermittent reception mode exists.

According to the IEEE 802.11 standard, a DTIM beacon is transmitted at a beacon cycle multiplied by a natural number. All STAs operating in intermittent reception mode may not always transit to the Awake state at the beacon cycle, but if a DTIM beacon is used, all STAs normally transit to the Awake state. Therefore the certainty of STAs receiving the transmission prohibition instruction can be improved by sending the transmission prohibition instruction using the DTIM beacon, or using a packet which is transmitted immediately before or immediately after the DTIM beacon.

Now a calculation of a value of the NAV period which is described in the duration field of the transmission prohibition instruction beacon or the transmission prohibition instruction packet will be described. The longer the NAV period is, the more periods which are allowed to transit to the Doze state increase, and the power saving effect can be expected, but if too long, a packet transmission delay is generated. Hence an appropriate value must be calculated for the NAV period. An example of the NAV period calculation method will be shown below.

In an admission control using TSPEC, an STA can describe priority, average data rate and packet size of the packet. Here it is assumed that STA1, STA2 and STA3 all notified the following information to the AP.

Priority: best effort
Data rate: 0.2 Mbps
Packet size: 1500 bytes

The AP which received this information performs the following calculation in a predetermined beacon cycle, so as to calculate the radio occupation time due to the above mentioned data communication. Here it is assumed that all STAs and APs are communication according to the IEEE 802.11b standard. It is also assumed that the beacon cycle is 100 ms, physical layer transmission rate is 11 Mbps, a long preamble, AIFSN at best effort is 2, and CWmin is 31.

Figure 9:
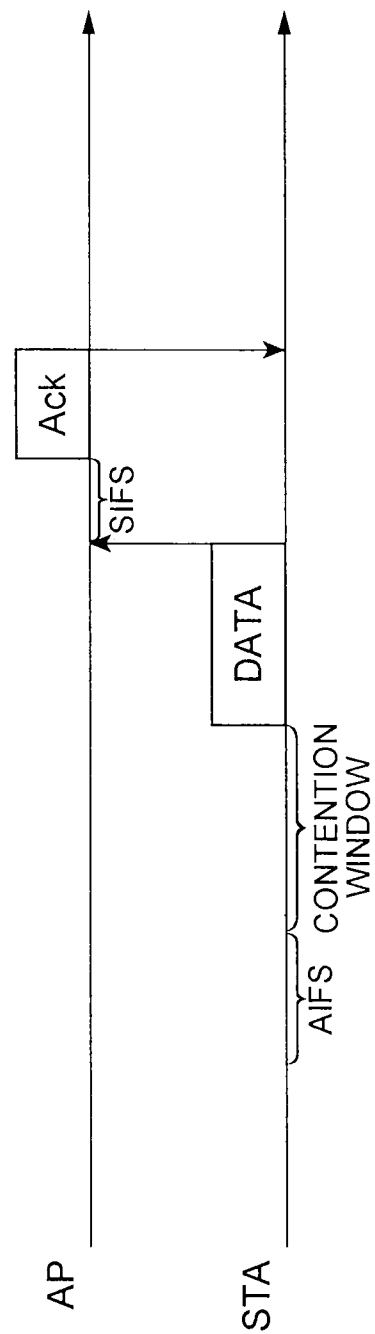
FIG. 9 is a diagram depicting a transmission/reception procedure of one data packet between AP and STA.
Figure 10:
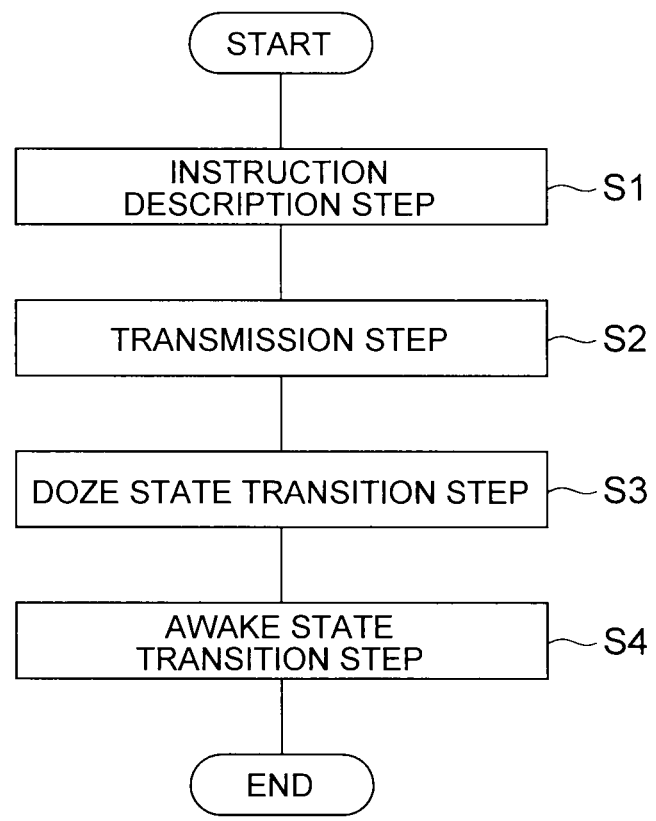
FIG. 10 is a flow chart depicting processing steps of a wireless communication control method according to the present invention.

FIG. 9 shows the transmission/reception procedure for one data packet between an AP and an STA. The time required for the transmission/reception procedure for one data packet is given by the following Expression 1.

Time required for transmission/reception procedure for one data packet=AIFS+average contention window length+time required for transmission of one data packet+SIFS+time required for transmission of ACK packet.   (Expression 1)

The IEEE 802.11b standard specifies that SIFS=10 [μs], and the slot time=20 [μs].

AIFS, average contention window length, time required for transmission of one data packet, and time required for transmission of the ACK packet respectively in Expression 1 are determined as follows.

$$AIFS = SIFS + AIFSN \times \text{slot time}$$
$$= 10 \text{ [μs]} + 2 \times 20 \text{ [μs]}$$
$$= 50 \text{ [μs]}$$

$$\text{Average contention window length} = CWmin/2 \times \text{slot time}$$
$$= 3\frac{1}{2} \times 20 \text{ [μs]}$$
$$= 310 \text{ [μs]}$$

Time required for transmission of one data packet =

$PLCP$ preamble (144 μs) + $PLCP$ header (48 bits) +

$MAC$ header (24 bytes) + $LLC$ header (8 bytes) + frame body (1500 bytes) + $FCS$ (4 bytes) =

144 [μs] + 48 [bits]/1 [Mbps] +

$(24 + 8 + 1500 + 4) \times 8$ [bits]/11 [Mbps] = 1309 [μs]

Time required for transmission of $ACK$ packet =

$PLCP$ preamble (144 μs) + $PLCP$ header (48 bits) + frame (10 bytes) +

$FCS$ (4 bytes) = 144 [μs] + 48 [bits]/1 [Mbps] +

$(10 + 4) \times 8$ [bits]/11 [Mbps] = 1928 [μs]

Based on Expression 1, the time required for the transmission/reception procedure for one data packet is determined as 50+310+1309+10+1928=3607 [μs]

Then the number of transmission packets per beacon cycle (100 ms) in one STA is determined. According to the notification from the STA based on TSPEC, the data rate is 0.2 Mbps, and the packet size is 1500 bytes, so the data rate converted into byte units becomes $0.2 \times 10^6/8$. Therefore the number of transmission packets per second is $0.2 \times 10^6/8/1500 \approx 16.6667$. Therefore a number of transmission packets in a beacon cycle (100 ms=0.1 s) is 16.6667×0.1=1.6667. Since there are three STAs in the present embodiments, a number of transmission packets of an entire cell per beacon cycle is 1.6667×3=5.0001.

In other words, the packet transmission which takes 3607 [μs] is generated 5.0001 times at a predetermined beacon cycle, so the radio occupation time in the unit beacon cycle in STA1, STA2 and STA3 is determined as 3607×5.001≅18035.36 [μs]=18.03536 [μs]

In other words, the AP can transit to the Doze state during the period of

100 [ms]−18.03536 [ms]=81.96464 [ms]=81964.64 [μs]

Here the NAV period is set in μs units, so the AP can describe the value of the NAV period "81964" in the duration field.

According to the above described embodiment of the present invention, not only is intermittent reception in STA implemented to achieve the power saving effect, but intermittent reception in the AP as well can be implemented to achieve the power saving effect in the AP.

The disclosure of Japanese Patent Application No. 2008-224984 filed on Sep. 2, 2008 including specification, drawings and claims is incorporated herein by reference in its entirety.

What is claimed is:

1. An access point for establishing wireless connection with one or more wireless communication stations which can perform intermittent reception operation, based on a packet transmission system which allocates wireless bands by CSMA/CA, comprising:

circuitry configured to describe, in a same packet or in respective packets, buffering information on a downlink packet addressed to a subordinate wireless communication station currently in an intermittent reception state, and transmission prohibition period information indicating a period where transmission from said subordinate wireless communication station is prohibited;

a transmitter that transmits the instruction described packet in which description has been made by said circuitry, to said subordinate wireless communication station, wherein the circuitry is configured to make a state of said access point transition to a Doze state immediately after said instruction described packet is transmitted by said transmitter or when a predetermined number of downlink packets are transmitted, make a state of said access point transition to an Awake state when said transmission prohibition period elapses from the time of transmission of the packet in which said transmission prohibition period information is described, set a transmission timing of said instruction described packet, and control the transmitter to transmit said instruction described packet at the set transmission timing.

2. The access point according to claim 1, wherein the circuitry calculates said transmission prohibition period.

3. An access point for establishing wireless connection with one or more wireless communication stations which can perform intermittent reception operation, based on a packet transmission system which allocates wireless bands by CSMA/CA, comprising:

circuitry configured to describe, in a same packet or in respective packets, buffering information on a downlink packet addressed to a subordinate wireless communication station currently in an intermittent reception state, and transmission prohibition period information indicating a period where transmission from said subordinate wireless communication station is prohibited;

a transmitter that transmits the instruction described packet in which description has been made by said circuitry, to said subordinate wireless communication station, wherein the circuitry is configured to
- make a state of said access point transition to a Doze state immediately after said instruction described packet is transmitted by said transmitter or when a predetermined number of downlink packets are transmitted,
- make a state of said access point transition to an Awake state when said transmission prohibition period elapses from the time of transmission of the packet in which said transmission prohibition period information is described,
- describe, in a same beacon, both said buffering information and said transmission prohibition period information,
- describe, in said beacon, said transmission prohibition period information and buffering information to notify that a unicast packet is not buffered but a broadcast packet is buffered regardless of the actual buffering state of the downlink packets,
- control the transmitter to transmit said beacon to said subordinate wireless communication stations, then transmit one or more unicast packets actually buffered, and then transmit a broadcast packet to notify that subsequent packets are not buffered, to said subordinate wireless communication stations, and
- transition a state of said access point to a Doze state after said broadcast packet is transmitted.

4. An access point for establishing wireless connection with one or more wireless communication stations which can perform intermittent reception operation, based on a packet transmission system which allocates wireless bands by CSMA/CA, comprising:
- circuitry configured to describe, in a same packet or in respective packets, buffering information on a downlink packet addressed to a subordinate wireless communication station currently in an intermittent reception state, and transmission prohibition period information indicating a period where transmission from said subordinate wireless communication station is prohibited;
- a transmitter that transmits the instruction described packet in which description has been made by said circuitry, to said subordinate wireless communication station, wherein
- the circuitry is configured to
  - make a state of said access point transition to a Doze state immediately after said instruction described packet is transmitted by said transmitter or when a predetermined number of downlink packets are transmitted,
  - make a state of said access point transition to an Awake state when said transmission prohibition period elapses from the time of transmission of the packet in which said transmission prohibition period information is described,
  - describe, in a same beacon, both said buffering information and said transmission prohibition period information,
  - generate a transmission prohibition instruction beacon, in which said transmission prohibition period information and buffering information to notify that neither a unicast packet nor broadcast packet is buffered regardless of the actual buffering state of the downlink packets are described, and a normal beacon in which actual buffering information of the downlink packet is described,
  - control the transmitter to transmit said transmission prohibition instruction beacon or said normal beacon to said subordinate wireless communication stations at a predetermined beacon transmission time, and
  - transition a state of said access point to a Doze state after said transmission prohibition instruction beacon is transmitted.

5. An access point for establishing wireless connection with one or more wireless communication stations which can perform intermittent reception operation, based on a packet transmission system which allocates wireless bands by CSMA/CA, comprising:
- circuitry configured to describe, in a same packet or in respective packets, buffering information on a downlink packet addressed to a subordinate wireless communication station currently in an intermittent reception state, and transmission prohibition period information indicating a period where transmission from said subordinate wireless communication station is prohibited;
- a transmitter that transmits the instruction described packet in which description has been made by said circuitry, to said subordinate wireless communication station, wherein
- the circuitry is configured to
  - make a state of said access point transition to a Doze state immediately after said instruction described packet is transmitted by said transmitter or when a predetermined number of downlink packets are transmitted,
  - make a state of said access point transition to an Awake state when said transmission prohibition period elapses from the time of transmission of the packet in which said transmission prohibition period information is described,
  - describe said buffering information in a beacon, and
  - describe said transmission prohibition period information in a packet which is different from said beacon.

6. The access point according to claim 5, wherein said circuitry is configured to
- describe, in said beacon, buffer information to notify that a broadcast packet is buffered regardless of the actual buffering state of the downlink packets,
- describe said transmission prohibition period information in a broadcast packet which is different from said beacon,
- control the transmitter to transmit said beacon in which said buffering information is described, then transmit said broadcast packet, or transmit said broadcast packet only after transmitting a predetermined number of unicast packets which are actually buffered,
- transition the state of said access point to the Doze state after transmitting said broadcast packet, and
- set a transmission standby time of said broadcast packet after the transmission of said beacon to a value smaller than a transmission standby time of an uplink packet which is transmitted by said subordinate wireless communication station.

7. The access point according to claim 5, wherein
said circuitry is configured to
- describe, in said beacon, buffering information to notify that no packet is buffered, regardless of the actual buffering state of the downlink packet, and describe said transmission prohibition period information in a broadcast packet which is different from said beacon,
- control the transmitter to transmit the broadcast packet, in which said transmission prohibition period information is described, at a predetermined beacon transmission time or immediately before the beacon transmission time, and then transmit said beacon in which said buffering information is described, and transition the state of said access point to the Doze state after said beacon is transmitted.

8. The access point according to claim 5, wherein said circuitry is configured to when a packet which is being buffered exists, describe, in said beacon, buffering information to notify that a broadcast packet is buffered, and describe said transmission prohibition period information in a broadcast packet for transmission prohibition instruction which is different from said beacon, control the transmitter to transmit said broadcast packet for transmission prohibition instruction at a predetermined beacon transmission time or immediately before the beacon transmission time, transmit said beacon in which said buffering information is described, then transmit one or more packets actually buffered, and then transmit a broadcast packet for end notification to notify that subsequent packets are not buffered, to said subordinate wireless communication stations, and transition the state of said access point to the Doze state after said broadcast packet for end notification is transmitted.

9. An access point for establishing wireless connection with one or more wireless communication stations which can perform intermittent reception operation, based on a packet transmission system which allocates wireless bands by CSMA/CA, comprising:

circuitry configured to describe, in a same packet or in respective packets, buffering information on a downlink packet addressed to a subordinate wireless communication station currently in an intermittent reception state, and transmission prohibition period information indicating a period where transmission from said subordinate wireless communication station is prohibited;

a transmitter that transmits the instruction described packet in which description has been made by said circuitry, to said subordinate wireless communication station, wherein the circuitry is configured to make a state of said access point transition to a Doze state immediately after said instruction described packet is transmitted by said transmitter or when a predetermined number of downlink packets are transmitted, make a state of said access point transition to an Awake state when said transmission prohibition period elapses from the time of transmission of the packet in which said transmission prohibition period information is described, judge whether all of said subordinate wireless communication stations are constantly operating in Awake mode or a subordinate wireless communication station operating in an intermittent reception mode exists, and when said circuitry judges that a subordinate wireless communication station operating in the intermittent reception mode exists, describe said transmission prohibition period information in a DTIM beacon or a packet which is transmitted immediately before or immediately after the DTIM beacon transmission time.

10. The access point according to claim 9, wherein when said circuitry judges that all the wireless communication stations are constantly operating in Awake mode, said circuitry control the transmitter to transmit the packet in which said transmission prohibition period information is described at a time which does not depend on the transmission timing of beacons.

11. A wireless communication system having an access point and one or more wireless communication stations that can perform intermittent reception operation, between which wireless connection is established based on a packet transmission system which allocates wireless bands by CSMA/CA, said access point comprising:

circuitry configure to describe, in a same packet or in respective packets, buffering information on a downlink packet addressed to a subordinate wireless communication station currently in an intermittent reception state, and transmission prohibition period information indicating a period where transmission from said subordinate wireless communication station is prohibited; and a transmitter that transmits the instruction described packet, in which description has been made by said instruction description unit, to said subordinate wireless communication station, wherein the circuitry is configured to make a state of said access point transition to a Doze state immediately after said instruction described packet is transmitted by said transmission unit, or when a predetermined number of downlink packets are transmitted, make a state of said access point transition to an Awake state when said transmission prohibition period elapses from the time of transmission of the packet in which said transmission prohibition period information is described, set a transmission timing of said instruction described packet, and control the transmitter to transmit said instruction described packet at the set transmission timing.

12. A wireless communication method that is executed by an access point which establishes wireless connection with one or more wireless communication stations which can perform intermittent reception operation, based on a packet transmission system which allocates wireless bands by CSMA/CA, the method comprising:

describing, in a same packet or in respective packets, buffering information of a downlink packet addressed to a subordinate wireless communication station currently in an intermittent reception state, and transmission prohibition period information indicating a period where transmission from said subordinate wireless communication station is prohibited;

transmitting the instruction described packet, in which description has been made, to said subordinate wireless communication station;

making a state of said access point transition to a Doze state immediately after said instruction described packet is transmitted, or when a predetermined number of said downlink packets are transmitted;

making a state of said access point transition to an Awake state when said transmission prohibition period elapses from the time of transmission of the packet in which said transmission prohibition period information is described;

set a transmission timing of said instruction described packet; and transmit said instruction described packet at the set transmission timing.

* * * * *